US000001191H

United States Statutory Invention Registration [19]

[11] Reg. Number: H1191

Hutchison et al.

[43] Published: Jun. 1, 1993

[54] ELECTROMAGNETICALLY ACTUATED SPOOL VALVE

[75] Inventors: Eric A. Hutchison; Michael S. Lukich, both of Peoria, Ill.

[73] Assignee: Caterpillar Inc.

[21] Appl. No.: 812,346

[22] Filed: Dec. 23, 1991

[51] Int. Cl.[5] ..... F15B 13/044; F15B 13/16

[52] U.S. Cl. ..... 91/459; 91/361; 137/625.65

[58] Field of Search ..... 91/459, 361; 137/625.65, 338; 251/65, 129.15

[56] References Cited

U.S. PATENT DOCUMENTS

| | | | |
|---|---|---|---|
| 2,750,961 | 6/1956 | Uritis | 137/625.5 |
| 3,294,148 | 12/1966 | Alvarado | 137/338 |
| 3,701,366 | 10/1972 | Tirelli et al. | 137/625.65 |
| 4,040,445 | 8/1977 | McCormick | 137/596.18 |
| 4,044,652 | 8/1977 | Lewis et al. | 91/459 |
| 4,144,514 | 3/1979 | Rinde et al. | 335/229 |
| 4,464,978 | 8/1984 | Ichirya et al. | 91/459 |
| 4,544,129 | 10/1985 | Ichiryu et al. | 251/129.01 |
| 4,635,683 | 1/1987 | Nielsen | 137/625.65 |
| 4,698,608 | 10/1987 | Kimble | 335/222 |
| 4,704,591 | 11/1987 | Hafner | 251/65 |
| 4,714,005 | 12/1987 | Leemhuis | 91/361 |
| 4,778,147 | 10/1988 | Kozuka et al. | 137/625.65 |
| 4,794,890 | 1/1989 | Richeson, Jr. | 123/90.11 |
| 4,808,955 | 2/1989 | Godkin et al. | 335/222 |
| 4,817,498 | 4/1989 | Takagi | 91/361 |
| 4,829,947 | 5/1989 | Lequesne | 123/90.11 |
| 4,831,973 | 5/1989 | Richeson, Jr. | 123/90.11 |
| 4,840,348 | 6/1989 | Takigawa et al. | 137/338 |
| 4,845,416 | 7/1989 | Scholl et al. | 381/600 |
| 4,892,328 | 1/1990 | Kurtzman et al. | 280/707 |
| 4,912,343 | 3/1990 | Stuart | 310/14 |
| 4,919,390 | 4/1990 | Ichiryu et al. | 251/129.15 |
| 4,938,179 | 7/1990 | Kawamura | 123/90.11 |
| 4,942.851 | 7/1990 | Kawamura | 123/90.11 |
| 4,955,334 | 9/1990 | Kawamura | 123/90.11 |
| 4,969,662 | 11/1990 | Stuart | 280/707 |
| 4,991,491 | 2/1991 | Neumann | 91/361 |
| 5,007,459 | 4/1991 | Asaoka | 137/625.65 |
| 5,010,911 | 4/1991 | Grant | 137/68.1 |
| 5,012,722 | 5/1991 | McCormick | 91/361 |
| 5,050,840 | 9/1991 | Kondo et al. | 251/129.15 |
| 5,079,989 | 1/1992 | Chipp et al. | 91/361 |
| 5,108,070 | 4/1992 | Tominaga | 137/625.65 |

FOREIGN PATENT DOCUMENTS 813411 9/1951 Fed. Rep. of Germany .

OTHER PUBLICATIONS

Aura Systems, Inc., The Aura System High Force Actuator, El Segundo, Calif. Jun. 1990.

Aura Systems, Inc., "Infinitely Variable Valve Electronic Timing and Control System (VETACS)", El Segundo, Calif. Jun. 1990.

*Primary Examiner*—David H. Brown

*Attorney, Agent, or Firm*—David M. Masterson

[57] ABSTRACT

An apparatus is provided for controllably positioning a movable element within a hydraulic motor in response to a flow request signal. An electric circuit receives the flow request signal and responsively produces an energization signal. An electromagnetic actuator has a core, and a coil with a plurality of windings wound as a helix around the core. The coil is adapted to receive the energization signal and responsively produce a magnetic force proportional to the magnitude of the energization signal forcing the core to move bidirectionally relative to the coil. A mechanical coupling has one end connected to and movable with the core. A directional valve includes a spool connected to the other end of the mechanical coupling. The directional valve precisely meters pressurized fluid to the motor causing the movable element to move in response to the movement of the core.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROMAGNETICALLY ACTUATED SPOOL VALVE

DESCRIPTION

1. Technical Field

This invention relates generally to electromechanical actuation of hydraulic valves and, more particularly, to electromagnetic actuation of hydraulic spool valves.

2. Background Art

Hydraulic systems provide the muscle for most of todays work vehicles. Earthmoving vehicles, such as excavators, backhoe loaders, and wheel type loaders are a few examples where hydraulic systems are desirable.

Typically, a hydraulic system includes pumps for supplying pressurized hydraulic fluid and large spool valves to direct and allocate the pressurized hydraulic fluid to respective hydraulic motors. The motors, in turn, are connected to work implements, i.e. a bucket, to facilitate its movement.

More particularly, a typical excavator has three basic implement circuits, consisting of: boom, stick, and bucket appendages. The appendage motion is controlled by metering high pressure hydraulic fluid via directional valves and hydraulic cylinders. An operator controls the appendage motion through one or more control handles which may mechanical, electrical or electrohydraulic devices. The control handles provide means for manual operation; in which the displacement of the control handles is indicative of the desired flow of hydraulic fluid.

Presently, auxiliary hydraulic systems, called "pilot systems", control the directional valves. Pilot systems usually have their own pumps, hydraulic lines, valves, and controls. These systems can be quite complex and expensive. Furthermore, the response of main valve spools to control signals from pilot valves is sometimes slow, especially for automated vehicle functions. The response of the hydraulic pilot system further degrades due to cold or impure hydraulic fluid.

One method which eliminates the use of pilot systems is employing mechanical hand operated linkages to operate the valves. However, hand operated linkages typically display poor response time. Additionally electrical or microprocessor control of such linkages are problematic. This renders them of little use for controlling a work vehicle's main valve. Moreover linkages, which utilize elaborate gearing schemes, are quite complex resulting in higher cost. This combination of control problems and expensive gearing limits the usefulness of such systems. Importantly, valve control systems on work vehicles must combine the qualities of dependability, safety, and simplicity at a reasonable cost.

Another method for eliminating the use of pilot systems incorporates a linear force motor having a floating coil as disclosed by J. F. McCormick in U.S. Pat. No. 5,012,722. However, inherent disadvantages become apparent with the design of McCormick. In applications requiring great amounts of mechanical force and displacement, the utility of the floating coil design is undesirable. For instance, a relatively high current is needed for high force applications. Naturally the inherent resistance of the coil produces large amounts of heat. With the design of McCormick the coil is prevented from dissipating much of the heat because the coil is insulated from the ambient environment due to the physical design of the motor, i.e. the coil is insulated by the air gap, permanent magnets, and motor housing. Therefore the force capacity is limited by the size of the motor. Consequently a floating coil linear motor large enough to produce the force necessary to operate a main stage hydraulic valve for an excavator while dissipating heat effectively, would be much too large and costly to use efficiently. Further, the motor disclosed by McCormick requires the electrical leads to move with the coil. Considering the frequency and length of movement, the leads would tend to fatigue and consequently break the electrical connection rendering the device inoperable.

The present invention is directed at overcoming one or more of the problems as set forth above.

DISCLOSURE OF THE INVENTION

In one aspect of the present invention, an apparatus is provided for controllably moving a movable element within a hydraulic motor in response to a flow request signal. A electric circuit receives the flow request signal and responsively produces an energization signal. An electromagnetic actuator has a core and a coil with a plurality of windings wound as a helix around the core. The coil is adapted to receive the energization signal and responsively produce a magnetic force proportional to the magnitude of the energization signal forcing the core to move bidirectionally relative to the coil. A mechanical coupling has one end connected to and movable with the core. A spool, associated with a directional valve, is connected to the other end of the mechanical coupling. The directional valve is adapted to deliver pressurized fluid to the motor causing the movable element to move in response to the movement of the core.

BRIEF DESCRIPTION OF THE DRAWINGS

For a better understanding of the present invention, reference may be made to the accompanying drawings in which.

BEST MODE FOR CARRYING OUT THE INVENTION

Figure 1:
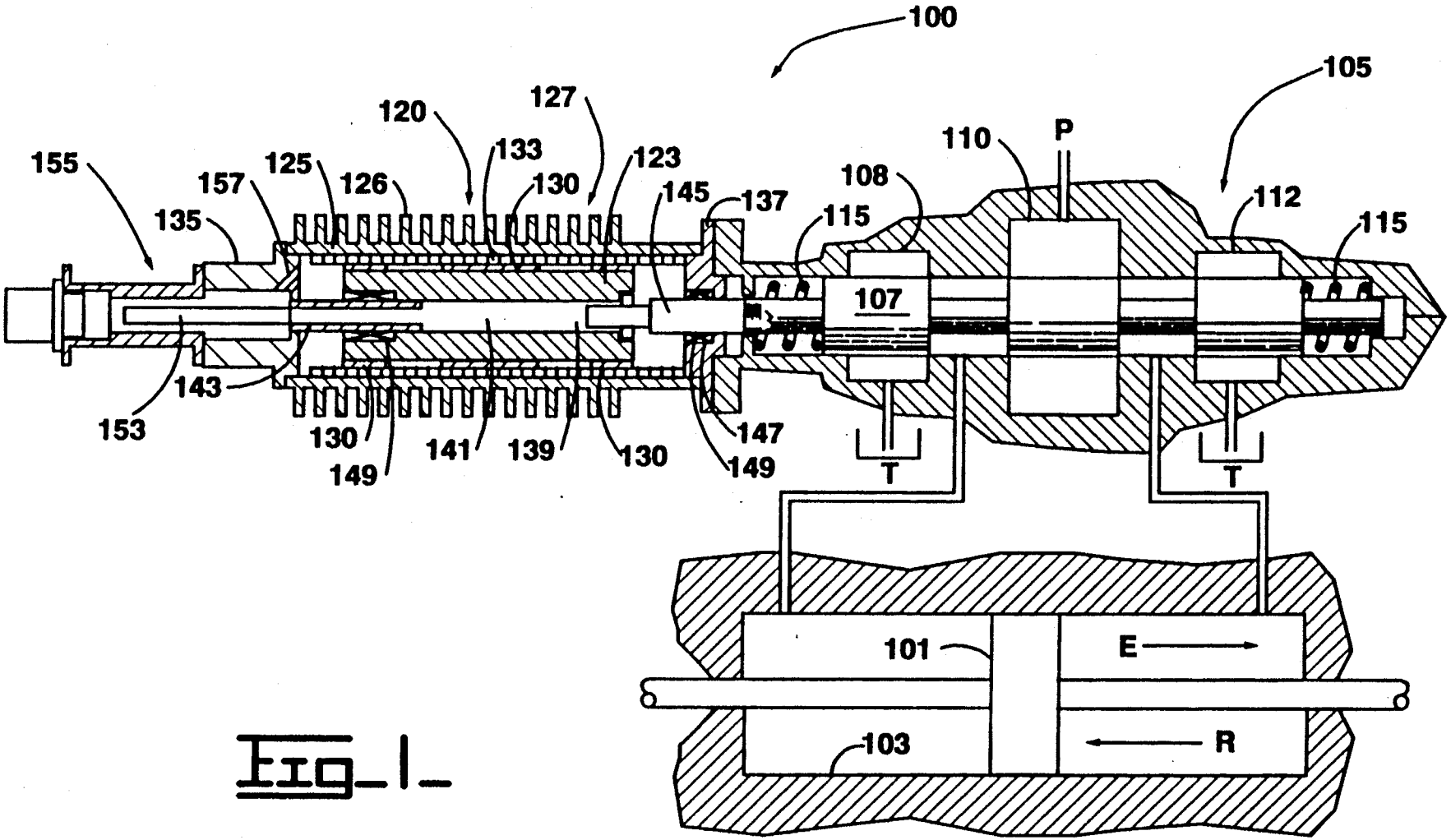
FIG. 1 illustrates a cross sectional view of an electrohydraulic system in accordance with the present invention.

With reference to FIG. 1, the present invention is adapted to controllably move a movable element 101 within a hydraulic motor 103. In the preferred embodiment, the hydraulic motor 103 is a hydraulic cylinder and the movable element 101 is a piston within the cylinder, as shown. The hydraulic motor 103 is not limited to a hydraulic cylinder. Depending on the particular application, the hydraulic motor 103 may equally be a symmetrical motor or a rotary motor with the movable element 101 being a rotor.

A closed-center directional valve 105 having a spool 107 meters hydraulic fluid to the hydraulic cylinder 103. The spool 107 is moveable within a range of three flow positions 108,110,112 for precisely controlling the flow of hydraulic fluid to the hydraulic cylinder 103. Note that the present invention is not limited to closed-center directional valves; the present invention is equally suited towards open-center, pressure compensated or non-pressure compensated directional valves as well.

In the first flow position 108, hydraulic fluid under pressure (generally denoted as P and typically below 10,000 psi) from a pump (not shown) passes through the directional valve 105 to the hydraulic cylinder 103. The hydraulic fluid, which flows to one end of the hydraulic cylinder 103, exerts a force on one end of the piston 101, thereby extending the piston 101 in the direction of the arrow labelled E. Hydraulic fluid from the other end of the hydraulic cylinder 103 passes through the directional valve 105 and back to a tank of the hydraulic fluid, T.

In the second or neutral flow position 110, the spool 107 is held at its current position by the use of centering springs 115. However, as discussed later, the spool 107 can be positioned to the neutral position 110 without the use of centering springs. Thus, the present invention is not limited to a specific spring assembly nor the usage of a spring assembly. Since the hydraulic fluid and the pump are doing minimal work, the pump is destroked, thereby reducing flow to minimize losses (note that the pump may remain stroked to power other hydraulic circuits).

When the spool 107 is in the third flow position 112, hydraulic fluid passes through the directional valve 105 to the other end of the hydraulic cylinder 103 and exerts a force on the other end of the piston 101, thereby retracting the piston 101 in the direction of the arrow labelled R. Hydraulic fluid from the one end of the hydraulic cylinder 103 returns through the directional valve 105 to the tank, T.

Coupled to the directional valve 105 is an electromechanical actuator 120. The actuator 120 consists of a cylindrical core 123 that is free to move axially. An annular space is formed between the cylindrical core 123 and a cylindrical shell 125 that surrounds the core 123. The core 123 and the shell 125 are made of soft iron. In the preferred embodiment, the cylindrical shell 125 is formed with a plurality of cooling fins 126. The use of cooling fins will be apparent as discussed later. A magnetic assembly 127 is disposed about the core 123. More particularly, a magnetic assembly 127 includes a plurality of cylindrical magnets 130 made from permanently magnetized material. The cylindrical magnets 130 are axially spaced and contiguous with the core 123. Preferably the cylindrical magnets 130 are radially magnetized and orientated on the core 123 such that the magnetic cylinders 130 are opposed in polarity. The magnetic cylinders 130 are fixed to the core 123 by a well known cementing process. The magnets 130 are made from a rare earth material where each magnet may be comprised of a plurality of individual, sectional magnets assembled to form a cylinder, as is well known.

A coil 133 is disposed in the annular space and is electrically insulated from the shell 125. However the coil 133 is located adjacent the shell 125, allowing the cooling fins 126 to rapidly dissipate the heat generated by an energized coil. The coil 133 comprises one or more layers of windings of an electrical connector wound in a common direction forming a helix. In this manner, the coil 133 is center tapped. Alternately, the coil 133 may be comprised of two separate coils connected in series, where each coil is wound in opposite directions. Note that the manner of winding the coil 133 is not critical to the present invention.

The shell 125 includes first and second end plates 135,137. The core 123 includes a bore 139 which defines a cylindrical space 141. The first end plate 135 has a cylindrical extension 143 adapted to be slidably engageable with the bore 139 of the core 123. A mechanical coupling 145 has one end attached to and movable with the core 123. The other end of the mechanical coupling 145 is attached to the spool 107. As shown, the mechanical coupling 145 is engageable with a bore 147 of the second end plate 137. The core 123 and the second end plate 137 each include a bushing disposed in the respective bores 139,147. Preferably the bushings 149 are made of a suitable material such as bronze or the like.

Advantageously, a sensing means 153 is disposed about the core 123. The sensing means 153 may be in the form of a linear voltage differential transformer (LVDT) which is adapted to sense the relative position of the core 123 and consequently the linear position of the spool 107. The LVDT is a device well known in the art. Alternately, the sensing means 153 may consist of a Hall cell adapted to determine the position of the core 123 relative to the shell 125. The Hall cell is adapted to detect the magnetic field produced by the energized coil 133. More particularly, the magnetic flux density detectable by the Hall cell is proportional to the movement of the core. Thus by detecting the magnetic flux density produced by the energized coil, the Hall cell senses the relative position of the core 123 and consequently the linear position of the spool 107.

An electrical connector assembly 155 is connected to the first end plate 135 of the shell 125. The electrical connector assembly 155 provides for power connections to the coil 133 and data connections to the sensing means 153. The first end plate 135 includes two passages 157 which allow electrical leads (not shown) to be attached to the coil 133.

The fluid flow rate and resulting velocity of the piston 101 within the hydraulic cylinder 103 is a function of the linear displacement of the spool 107, which in turn, is a function of the linear displacement of the core 123 as determined by electrical signals applied to the coil 133. Thus the controlled fluid flow is directly determined by the electrical signals, or more particularly, an energization signal applied to the coil 133 as discussed below.

The energization signal energizes the coil 133 producing a force on the core 123, and through the mechanical coupling 145, proportionately positions the spool 107 within the directional valve 105. More particularly, the energization signal travels to the windings of the coil 133 wherein the direction of current flow within one end of the coil 133 is opposite in direction relative to the other end. Consequently, a magnetic field proportional to the magnitude of the energization signal is generated. Therefore the force generated by the energization signal traveling through coil 133 is additive with respect to the static magnetic field generated by the permanent magnets, yielding a high force causing the core 123 to accelerate. The core 123 and thus the spool 107 is controllable through the entire range of movement in response to the orientation and magnitude of the energization signal.

For example, an energization signal with an average DC current value having positive magnitude causes acceleration of the core 123 and correspondingly the spool 107 to move causing extension of the piston 101 relative to the cylinder 103. Alternately, an energization signal with an average DC current value with a negative magnitude causes acceleration of the core 123 and correspondingly the spool 107 to move causing retraction of the piston 101 relative to the cylinder 103. Applying the energization signal to the coil 133 with an average DC value of zero Amperes essentially has no affect on the position of the core 123. Preferably, the energization signal is a high frequency bipolar pulse width modulated signal.

Acceleration of the core 133 is achieved by changing the bipolar pulse width (duty cycle) of the energization signal applied to the coil 133. The magnitude of the acceleration of the core 123 is controlled by the pulse width of the energization signal, while the direction of the core 123 is controlled by the polarity of the energization signal. Preferably, the choice of the frequency is at least one order of magnitude above the mechanical-/electrical resonances of the electromechanical system to avoid unstable behavior. The chosen frequency reduces nonlinear hysteresis and dead band of the system. A typical frequency for the energization signal is 500 Hz, for example. Alternately the energization signal may be a DC current signal having a high frequency carrier (dither), used to mitigate hysteresis. The specific conditioning of the energization signal is not critical to the present invention.

Figure 2:
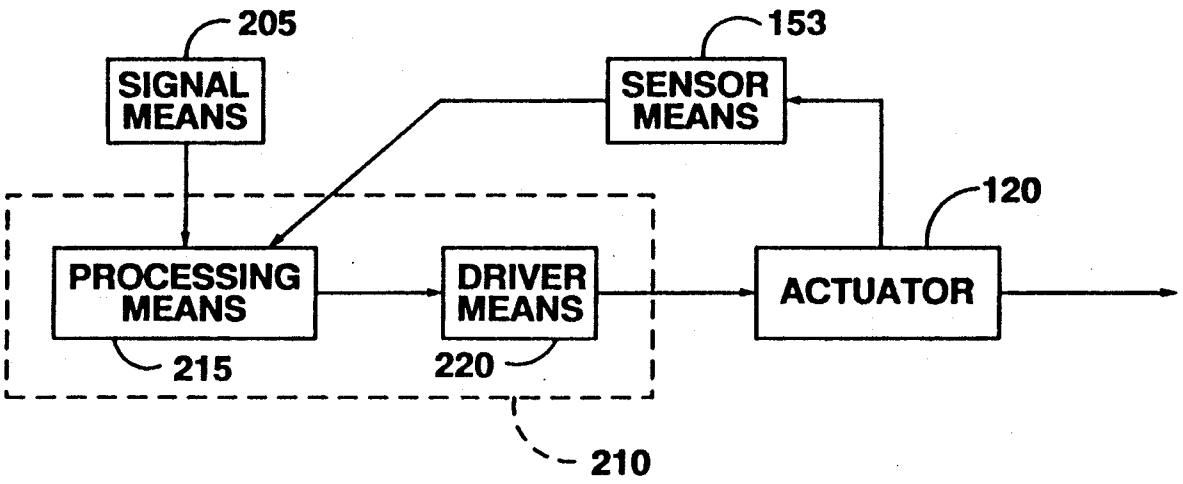
FIG. 2 illustrates a functional diagram showing the control system associated with the present invention.

FIG. 2 is a block diagram of the control system for the present invention. The control system utilizes a servo control loop to control the displacement of the spool 107. Generally, a control means 210 receives control information indicating a desired operation of the hydraulic cylinder 103 through a flow request signal, and feedback information indicating the measured position of the spool 107.

A signal means 205 produces a flow request signal indicative of the desired position of the spool 107, and thus the velocity of the piston 101 relative to the cylinder 103. The control means 210 receives the flow request signal and responsively produces the energization signal. The control means 210 includes a driver means 220 which is a pulse width modulation (PWM) amplifier. More particularly, the driver means 220 transmits the energization signal to the coil 133 as described above to accelerate the core 123 and operate the directional valve 105 as required by the flow request signal. In turn, the directional valve 105 causes hydraulic pressure to operate the hydraulic cylinder 103 in a desired manner.

Feedback in the system may be taken from the position of the core 123, or the spool 107. Preferably, the sensing means 153 provides positional feedback indicative of the position of the core 123 thus indicating the position of the spool 107. The sensing means 153 may be used to feedback signals representing various states including: differential pressure across the valve ports of the directional valve 105, velocity, acceleration, and/or force of the core 123 or stem 107.

In the preferred embodiment, the sensor means 153 determines the linear position of the core 123 and produces a position signal. A processing means 215 receives the flow request signal and sensed position signal, and produces an error signal responsive to a difference between the magnitude of the desired position signal and the sensed position signal. Correspondingly, the driver means 220 transmits the energization signal in response to the error signal, causing the error signal to approach zero.

The design, operation, and dynamics of electromechanical servo loops are well known in the art and will not be discussed in detail. However, one method for controlling the hydraulic cylinder piston 101 in response to velocity and/or positional feedback is described in patent application No. 07/540,726 by Lukich et al. assigned to Caterpillar Inc. It should be pointed out that the response of the servo loop discussed is limited by the inertia of the system: the core 123, mechanical coupling 145, and the spool 107. Such a control scheme can be implemented by either a digital processor, such as a micro-computer, or an analog processor, such as an operation amplifier circuit.

Moreover, the manner of control is not critical to the present invention. If open-loop control is implemented, it may be desirable to utilize the centering springs 115 to provide a counter force which balances the electromagnetic force produced by the actuator 120. Alternatively if closed-loop control is implemented, it may be desirable to eliminate the usage of the centering springs 115 in a manner that provides for the springs 115 not to interfere with the operation of the spool 107 except in instances when the motion of the spool 107 becomes inhibited.

Industrial Applicability

Large work vehicles especially those used in the earthmoving industry require hydraulic power to operate work implements. A typical hydraulic system has a fluid reservoir, multiple pumps, valves, linear or rotary motors, and a hydromechanical pilot system. Electrically powered actuators can replace the hydromechanical pilot system in many instances. Electronic controls can then be efficiently integrated with the hydraulic power system.

An electronic valve actuator, as described previously, is mounted to the main spool of each valve previously controlled by a hydraulic pilot valve. An electronic joystick substitutes for the mechanical linkage necessary to actuate the pilot valve. Electronic control handles (joysticks) combined with the electronic valve actuator significantly improves the response and controllably of the main spool allowing more flexible placement of the valves on the vehicle.

The flow request signal may be delivered by a manual, semiautomatic, or automatic control system. The source of the flow request signal is not relevant to the present invention. In manual operation, the signal means 205 is provided electronically by an electronic control handle which transmits a flow request signal representative of a desired valve position to the control means 210. A sensor 153 effectively monitors the spool 107 position and transmits a signal to the control means 210 proportional to a measured position. As the operator moves the joystick, he is requesting a predetermined motion from a work implement. Therefore, the valve spool responsible for causing such motion must be controlled accordingly. When the desired position signal changes, control means 210 attempts to reduce the error signal produced to zero. In order to reduce the error signal, the spool position must be altered such that the sensed signal approaches the desired signal. The coil 133 of the electromechanical actuator 120 energizes, thus causing linear acceleration of the core 123, precisely positioning the spool 107 to the desired position. Thus, the work implement is controlled in a quick and smooth fashion.

Advantageously the electrohydraulic system in accordance with the present invention utilizes a moving magnet design. Consequently heat generated by the coil 133 is quickly dissipated by the cooling fins 126, because the coil 133 is located adjacent the shell 125. Therefore, an electromechanical actuator 120 having the force requirements necessary to position the main stem of a hydraulic valve is favorably compact because of the superior heat dissipating characteristics. Thus, the present invention provides for an electrohydraulic system that can be utilized in many locations of the work vehicle where space is limited.

Other aspects, objects and advantages of the present invention can be obtained from a study of the drawings, the disclosure and the appended claims.

We claim:

1. An electro-hydraulic apparatus for controllably moving a movable element within a hydraulic motor in response to a flow request signal, comprising:

processing means for receiving said flow request signal, and producing a desired position signal in response to the magnitude of said flow request signal;

driver means for transmitting an energization signal in response to said desired position signal; a single high force linear actuator including:

a core;

a plurality of cylindrical permanent magnets being axially spaced with and contiguous to said core; and a coil with a plurality of helical windings circumjacent said magnets, said coil being adapted to receive said energization signal and responsively energize, said energized coil producing a magnetic flux proportional to the magnitude of said energization signal forcing said core to move bidirectionally relative to said coil;

a mechanical coupling having one end connected to and movable with said core; and a directional valve including:

a longitudinal valve housing having a plurality of fluid ports;

a spool being slidably disposed within said valve housing and being connected to the other end of said mechanical coupling, said spool being moveable within a range of three flow positions to deliver pressurized fluid to said motor causing movement of the element; and a pair of centering springs disposed within said valve housing and being adapted to move said spool to a second flow position stopping the delivery of pressurized fluid to and from said motor;

whereby said spool is moved to a first and third flow position by the core in response to said coil being energized, and the second position by the centering springs in response to said coil being deenergized.

2. An apparatus, as set forth in claim 1, wherein said linear actuator includes a cylindrical shell which encloses said coil, said cylindrical shell having a plurality of cooling fins formed at the periphery thereof.

3. An apparatus, as set forth in claim 1, wherein said directional valve is connected between a source of pressurized fluid and said hydraulic motor.

4. An apparatus, as set forth in claim 3, wherein said hydraulic motor is a hydraulic cylinder and said movable element is a piston.

5. An apparatus, as set forth in claim 1, including sensor means for determining the linear position of said core and producing a position signal.

6. An apparatus, as set forth in claim 5, wherein said processing means receives said sensed position signal, and produces an error signal proportional to a difference between the magnitude of said desired position signal and said sensed position signal.

7. An apparatus, as set forth in claim 6, wherein said driver means transmits said energization signal in response to said error signal.

8. An apparatus, as set forth in claim 7, including sensor means for determining the linear position of said core and producing a position signal.

9. An apparatus, as set forth in claim 8, wherein said processing means receives said sensed position signal, and produces an error signal proportional to a difference between the magnitude of said desired position signal and said sensed position signal.

10. An apparatus, as set forth in claim 9, wherein said driver means transmits said energization signal in response to said error signal.

* * * * *